(12) United States Patent
Schneider et al.

(10) Patent No.: US 11,841,197 B2
(45) Date of Patent: Dec. 12, 2023

(54) DATA LOGGER DEVICE AND SYSTEM FOR HIGH PRESSURE LEANING LANCE DRIVE APPARATUS

(71) Applicant: STONEAGE, INC., Durango, CO (US)

(72) Inventors: Timothy Schneider, Durango, CO (US); Joseph Schneider, Durango, CO (US); Rawlin Brown, Cortez, CO (US)

(73) Assignee: STONEAGE, INC., Durango, CO (US)

( * ) Notice: Subject to any disclaimer, the term of this patent is extended or adjusted under 35 U.S.C. 154(b) by 923 days.

(21) Appl. No.: 16/839,927

(22) Filed: Apr. 3, 2020

(65) Prior Publication Data

US 2020/0232729 A1  Jul. 23, 2020

Related U.S. Application Data

(63) Continuation of application No. PCT/US2018/056518, filed on Oct. 18, 2018.

(60) Provisional application No. 62/575,949, filed on Oct. 23, 2017.

(51) Int. Cl.
| | |
|---|---|
| *G01P 1/14* | (2006.01) |
| *F28G 15/00* | (2006.01) |
| *F28G 1/16* | (2006.01) |
| *F28G 15/04* | (2006.01) |
| *G01P 5/14* | (2006.01) |
| *G07C 3/02* | (2006.01) |
| *G01D 9/00* | (2006.01) |
| *G01L 19/08* | (2006.01) |
| *F28G 15/06* | (2006.01) |

(52) U.S. Cl.
CPC ............. *F28G 15/003* (2013.01); *F28G 1/16* (2013.01); *F28G 15/04* (2013.01); *F28G 15/06* (2013.01); *G01D 9/005* (2013.01); *G01L 19/08* (2013.01); *G01P 5/14* (2013.01); *G07C 3/02* (2013.01)

(58) Field of Classification Search
CPC .......... F28G 15/003; F28G 1/16; F28G 15/04; F28G 15/06; G01D 9/005; G01L 19/08; G01P 5/14; G07C 3/02
See application file for complete search history.

(56) References Cited

U.S. PATENT DOCUMENTS

| 4,096,747 A | 6/1978 | Gilson |
| 5,129,455 A * | 7/1992 | Boisture ............ B65H 75/4402 165/95 |
| 7,490,510 B2 | 2/2009 | Agami et al. |
| 10,543,514 B2 * | 1/2020 | Schaer, III ................ B08B 3/02 |
| 10,710,127 B2 * | 7/2020 | Barnes .................. B08B 9/0936 |

(Continued)

OTHER PUBLICATIONS

International Search Report and Written Opinion, dated Feb. 7, 2019, from corresponding International Patent App. No. PCT/US2018/056518.

*Primary Examiner* — Freddie Kirkland, III
(74) *Attorney, Agent, or Firm* — Stephen Y. Liu; Carstens, Allen & Gourley, LLP (57) ABSTRACT

A data logger device for monitoring operation of a flexible lance drive apparatus is disclosed that includes a cylindrical housing removably connected to an air fluid pressure line to the drive apparatus, a circuit board mounted in the housing, a pressure sensing switch mounted on the circuit board and communicating with the fluid in the pressure line, and a processor and memory on the board operable to log time at which the switch changes state between two predetermined states.

20 Claims, 5 Drawing Sheets

(56) References Cited

U.S. PATENT DOCUMENTS

2013/0003781 A1    1/2013   Delbos et al.
2016/0023264 A1    1/2016   Barnes
2017/0219395 A1    8/2017   Imai et al.

* cited by examiner

DATA LOGGER DEVICE AND SYSTEM FOR HIGH PRESSURE LEANING LANCE DRIVE APPARATUS

CROSS REFERENCE TO RELATED APPLICATIONS

This application is a continuation application of PCT/US 2018/056518, filed Oct. 18, 2018 which claims the benefit of priority of U.S. Provisional Patent Application Ser. No. 62/575,949, filed Oct. 23, 2017, the content of both of which is hereby incorporated by reference in their entirety.

BACKGROUND OF THE DISCLOSURE

The present disclosure is directed to industrial waterblasting cleaning systems. Conventional waterblasting industrial equipment is typically done mostly by hand, by an operator manipulating a high pressure cleaning lance directly or with the aid of air controls located within a visual area of the equipment being cleaned, such as a heat exchanger tube bundle. Maintenance of such cleaning equipment is often done sporadically or upon visual inspection and identification of damage to equipment such as the lance drives, hoses, fittings and pumps. In order to gain a handle on operating history for a high pressure cleaning lance drive apparatus such as is utilized in industrial heat exchanger tube cleaning operations it would be helpful if operating times, pressures and frequencies, as well as ancillary operations such as number of times a dump valve is tripped, a back and forth pecking operation is performed, etc. Currently there is no such data collection apparatus and methodology available.

SUMMARY OF THE DISCLOSURE

The present disclosure directly addresses such needs. In particular, embodiments of the present disclosure are directed to a data logger device and a lance drive apparatus incorporating a data logger device for collecting operational times, pressures and ancillary data associated with operation of a flexible tube cleaning lance drive apparatus during various tube and surface cleaning operations. One exemplary embodiment in accordance with the present disclosure of a data logger device includes a pressure sensing switch which senses control air pressure being applied and removed from a lance drive apparatus such as a StoneAge Inc. dual lance drive ABX-2L or three lance drive ABX-3L.

An exemplary data logger device for connection to a control air to a flexible cleaning lance hose drive apparatus in accordance with this disclosure includes a cylindrical housing having a central axis and is removably fastened to an air pressure line via a quick disconnect fitting. The receiving quick disconnect fitting on the air pressure line has a check valve to block air flow through the receiving fitting if the device is disconnected. The device has a circuit board mounted in the housing parallel to the axis, a pressure actuated switch mounted on the circuit board operable to move between first and second positions in response to pressure within the line, and a time datalogging processor and memory on the circuit board communicating with a USB port in the housing for recording clock time of switch actuations.

A data logging apparatus in according with the present disclosure may be viewed as including one of a male and female quick disconnect connector fitting adapted to fasten to a flexible lance drive apparatus, a data logger housing fastened to one end of the quick disconnect connector, and a pressure actuated switch in the housing communicating with fluid in the connector fitting operable to switch between predetermined positions upon sensing a predetermined pressure within the fluid.

A data logging system for a high pressure waterblasting cleaning apparatus in accordance with the present disclosure may include a plurality of data logging devices, as above described, and communicating with and to a control circuit for automatically sensing and logging operation of a plurality of flexible cleaning lance drive devices. One of the data logging devices is preferably operably connected to a high pressure dump valve control for automatically diverting high pressure fluid to atmosphere upon sensing a predetermined event.

One embodiment in accordance with the present disclosure may be viewed as a flexible cleaning lance hose drive apparatus that includes a drive housing, a first air motor in the drive housing for driving a lance hose through the drive housing in a first direction, a second air motor in the drive housing for driving the lance hose in a second, opposite direction, a data logging device operably connected to the first air motor via an air line. The data logging device preferably includes a cylindrical housing removably connected to the first air motor via a quick disconnect fitting. A circuit board is mounted in the housing. A pressure transducer is mounted on the circuit board in the housing that is operable to sense pressure within the air line. The device also includes a datalogging processor and memory on the circuit board in the housing that communicates with the transducer for recording clock time of sensed pressure from the transducer. The pressure transducer is preferably connected to a switch operable to move between a first position and a second position in response to a predetermined pressure sensed within the air line. In some embodiments, the pressure transducer is a piezoelectric pressure cell operable to continuously monitor air pressure values in the air line in real time. The piezoelectric pressure cell may preferably provide an input to automated lance hose drive control circuitry external to the data logger device.

Further features, advantages and characteristics of the embodiments of this disclosure will be apparent from reading the following detailed description when taken in conjunction with the drawing figures.

DETAILED DESCRIPTION

Figure 1:
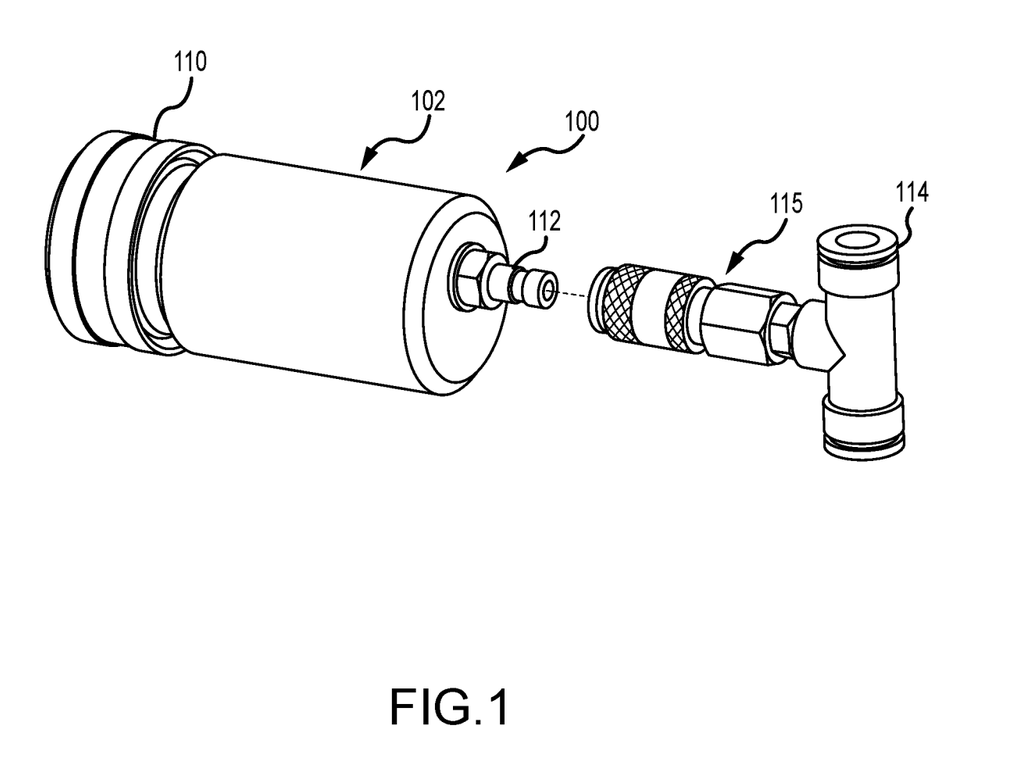
FIG. 1 is an assembled perspective view of an exemplary embodiment of data logger device in accordance with the present disclosure for installation in a control air line between a lance drive apparatus and the air motor control panel for the lance drive apparatus.

FIG. 1 shows an assembled perspective view of a first exemplary data logger device 100 in accordance with the present disclosure. Device 100 operates to sense and log times at which fluid pressure reaches a predetermined value. The device 100 comprises a hollow housing 102 containing therein a pressure sensor 104, a switch 106, and an electronic data logging circuit 108. The housing 102 has a closable end cap 110 at one end, and a quick disconnect, preferably cam-lock fitting 112 at an opposite end communicating fluid pressure in a T shaped control line fitting 114 with the pressure sensor 104 via a complementary cam-lock fitting 115.

Figure 2:
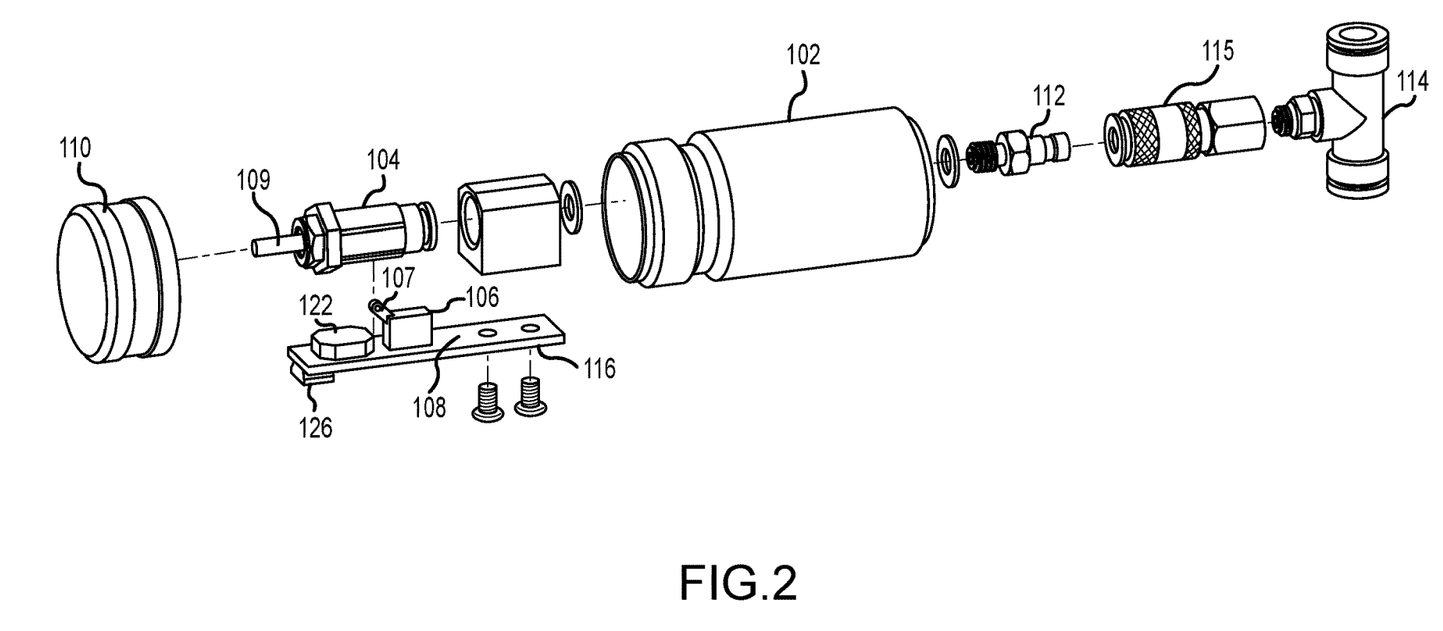
FIG. 2 is a separate exploded perspective view of the components of the data logger device shown in FIG. 1.
Figure 3:
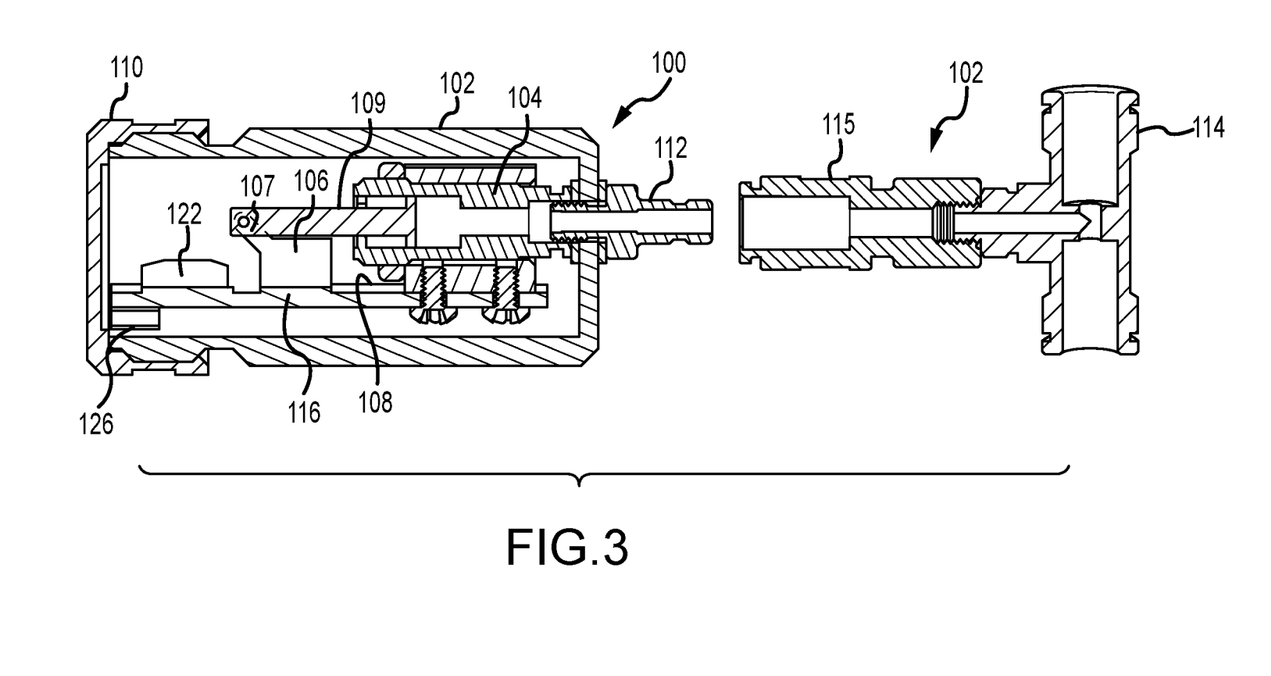
FIG. 3 is a longitudinal sectional view of the exemplary embodiment of the device in accordance with the present disclosure shown in FIG. 1.

In the exemplary embodiment shown in FIGS. 1 through 3, the housing 102 is a hollow cylindrical body supporting a circuit board 116 and the pressure sensor 104. The housing 102 preferably includes a removable screw-on cap 110 over one end of the housing 102 and the quick disconnect fitting 112 at the opposite end.

Figure 4:
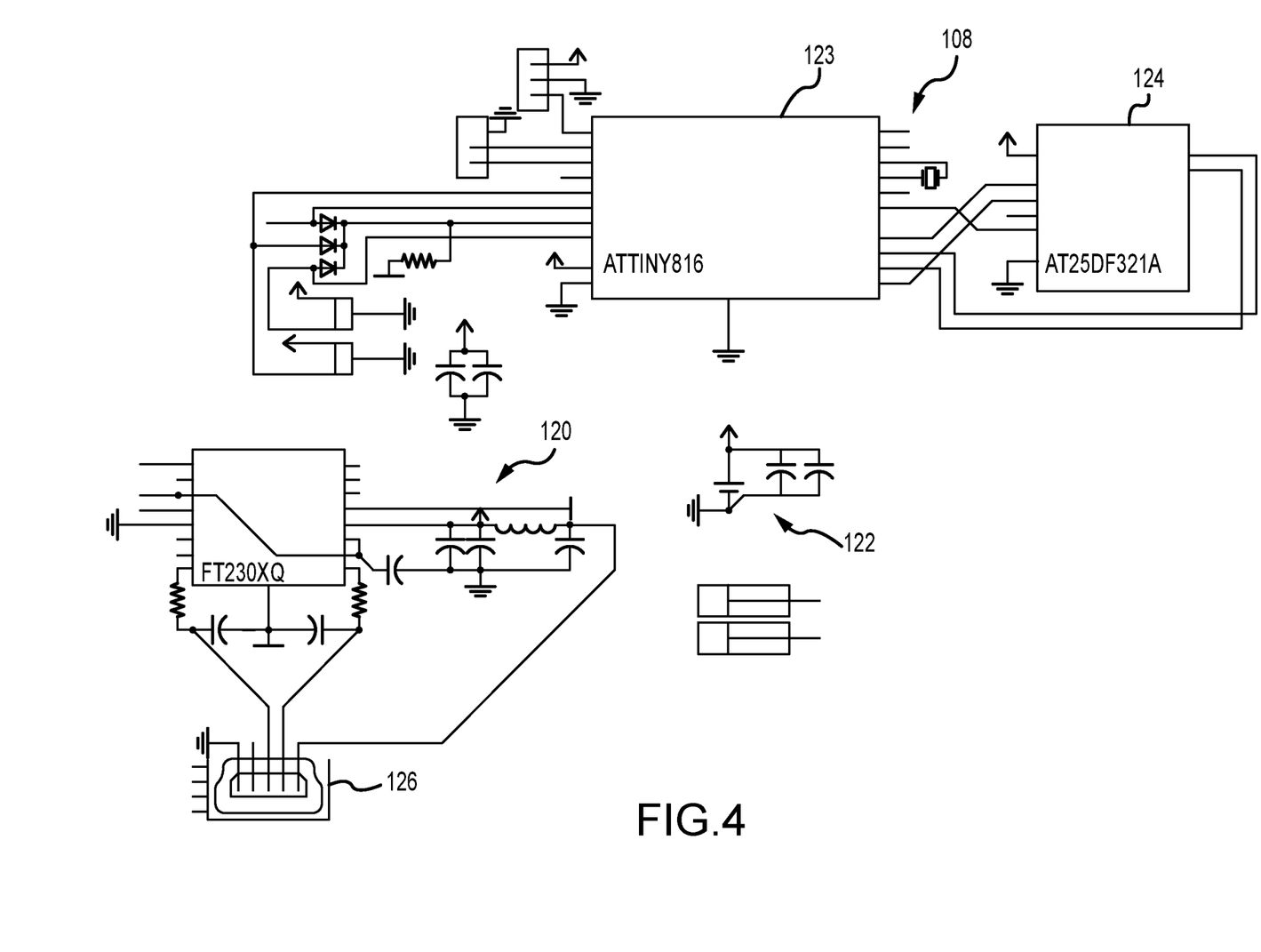
FIG. 4 is an electrical schematic diagram of the data logger circuitry in the exemplary device shown in FIGS. 1-3.

The circuit board 116 supports the switch 106 along with a circuit 108, shown in FIG. 4, including data link/communication circuit 120, a battery power supply 122 for the data link/communication circuit 120, data processor and clock circuit 123, a data storage memory 124, and an output connector such as a USB-3 connector 126. Alternatively the functionality of the output connector 126 may be replaced with a wireless transmitter for communicating with an external processor in a remote location.

The pressure sensor 104 in this exemplary device 100 includes a spring loaded plunger 109 that is oriented to actuate the switch 106 when fluid pressure exceeds a predetermined value, and oppositely operate the switch 106 upon loss of sensed fluid pressure. In this embodiment 100 the datalogger circuit 108 simply records times of application and removal of control air pressure to the lance drive apparatus to which it is connected.

In other embodiments, the pressure sensor 104 and switch 106 may be replaced with a piezoelectric pressure cell, piezoresistive strain gauge or other pressure transducer that can monitor and record these on/off transitions plus additional information such as real time monitoring and tracking of air and/or working fluid pressure values, and/or can be connected to actual air motor drive pressure to monitor and provide an input to automated control circuitry to anticipate and sense obstacles in tubes being cleaned, initiate automated lance reversal operations such as an autostroke function, as well as automatically initiate cleaning fluid pressure dump operations in the event of unexpected events. When done automatically, such a dump function can be actuated much faster than the lance operator can manually perform such action.

The pressure sensor 104 in embodiment 100 is mechanically connected to an actuating arm 107 on the switch 106. The switch 106 in this embodiment 100 is a simple single pole single throw switch. When an operator applies control air to the lance drive air motor in a lance drive apparatus (not shown), for example, the pressure sensor 104 extends plunger or stem 109 out of its supporting case to move the actuating arm 107 to activate the switch 106 to either close or open the internal contact of the switch in the circuit 108. The circuit 108 then records a time stamp of that operation. When control air pressure is removed, the pressure sensor 104 repositions the switch 106 via spring force on the stem 109 and another time stamp is triggered as the contact within the switch 106 is repositioned. These time stamps are recorded in the internal memory of the circuit 108 for later retrieval, analysis and processing.

An automated or semi-automated system for controlling lance drive operation may include a plurality of datalogger devices such as device 100 as inputs to the control system to augment operational control of a single or multiple flexible cleaning lance drive system, monitor operational parameters such as individual lance drive speed, lance hose resistance to forward motion, lance direction and penetration distance, as well as calculation of applied torque to individual lances, and monitoring of fluid system pressures and operating times.

Further, one or more of the datalogger devices 100 may be configured to automatically actuate a cleaning fluid pressure dump valve to divert pressure to atmosphere in the event of an unanticipated event such as a high pressure fluid lance hose break, unanticipated rise or drop in lance operational parameters, etc. as an automated safety system. Such an automated safety system can actuate a high pressure fluid dump valve in less time than an operator would take to perform the same operation, as a backup for the current manual foot actuated dump valve safety system or electric E-stops (red Emergency stop buttons) being utilized throughout the high pressure fluid e.g. waterblasting industry.

Figure 5:
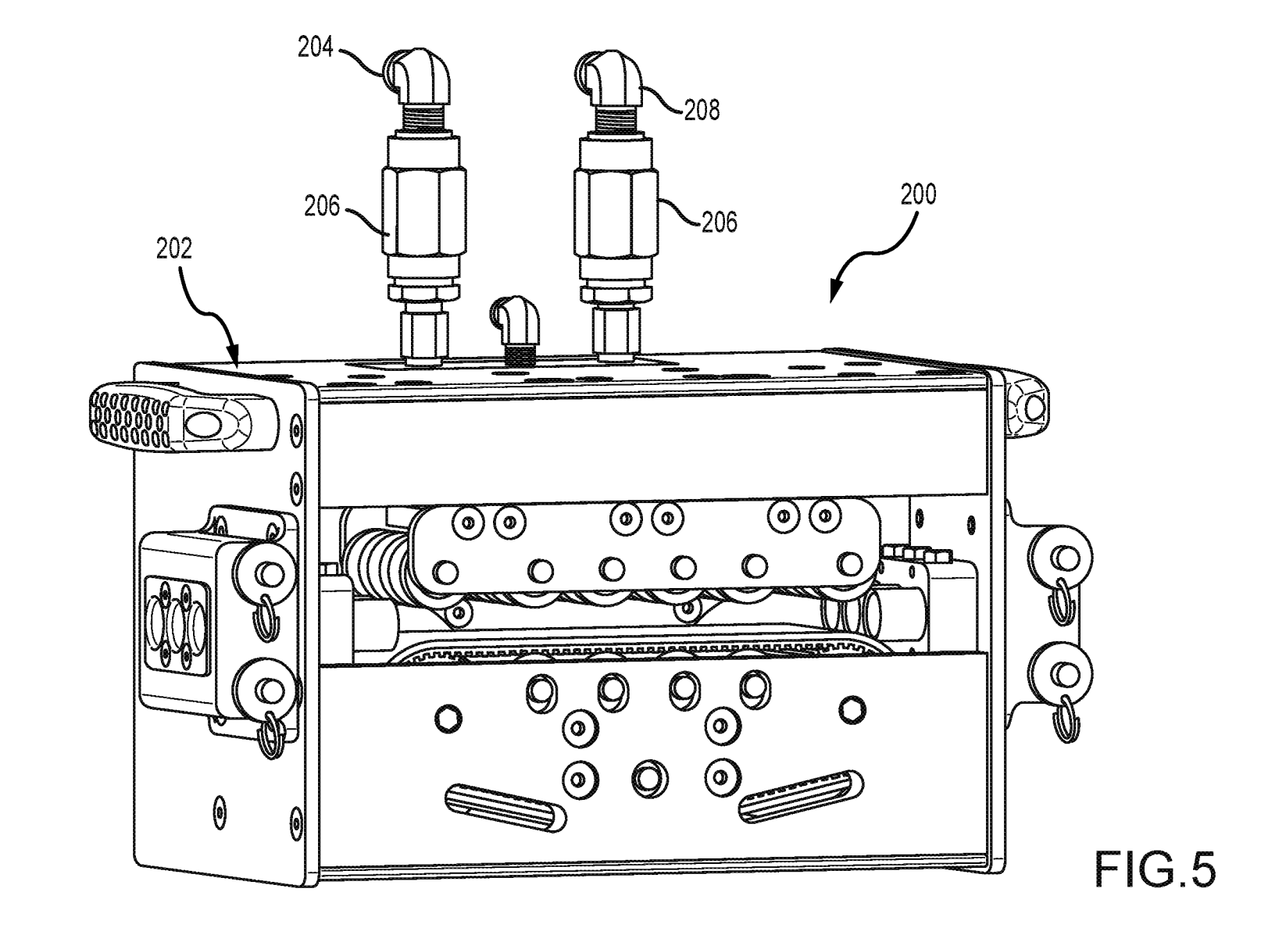
FIG. 5 is a perspective view of an exemplary lance drive incorporating one embodiment of the data logging device shown in FIGS. 1-4.

An exemplary high pressure cleaning lance hose drive apparatus 200 incorporating two datalogger devices 100 according to the present disclosure is shown in FIG. 5. This exemplary drive apparatus 200 is described in detail in our US. Pat. No. 9,896,299. In this exemplary embodiment 200, an inner vertical support wall of the drive housing 202 carries a pair of pneumatic drive motors (not shown). One lance drive motor is connected to a pneumatic forward feed line 204 via a T shaped fitting 206 similar to control line fitting 114 as illustrated in FIGS. 1-3. The other drive motor is connected to a reverse feed line 208 through another T shaped fitting 206.

Each fitting 206 taps into a data logger device 100 described herein. The data logger devices 100 each sense pressure in their respective lines 204 and 208 and in one embodiment, sense and log actuation events of the air motors to which they are connected. For example, each device 100 may record a timestamp when air pressure is supplied to the air motor and another timestamp when air pressure is removed. These timestamps are logged for future use, such as in determining lifetime actuations of the drive for maintenance purposes. In other embodiments, the data logger devices 100 in drive apparatus 200 may be connected to control circuitry for performing autostroke functions to remove blockages within tubes being cleaned, track operator use of the drive apparatus 200 or provide input for later statistical analysis.

Many changes may be made to the datalogger device 100, which will become apparent to a reader of this disclosure. For example, the pressure switch 106 may be replaced with a Hall effect sensor to pick up the on/off signal. In such an embodiment a magnet would be installed on the end of the cylinder plunger 109 and movement over the Hall effect sensor would be detected and recorded. The circuit 108 including board 116, switch 106 and pressure sensor 104 of the device 100 may be miniaturized and functionally incorporated into a single fitting that can be threaded, snap fit, or otherwise attached to a fluid T connection 115 of an air motor control line, or directly connected to an appropriate fitting on a fluid lance hose drive apparatus such as drive apparatus 200. Furthermore, the switch 106 and pressure sensor 104 may be replaced with a piezoresistive strain gauge coupled directly to a monitoring circuit within an automated lance control system.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A data logger device for connection to an air pressure supply line to an air motor driving a flexible cleaning lance hose drive apparatus, the device comprising:
   a cylindrical housing having a central axis and removably fastenable to a pressurized air supply line to an air motor driving a flexible lance hose drive apparatus via a quick disconnect fitting connector;
   a circuit board mounted in the housing parallel to the axis;
   a pressure transducer mounted on the circuit board in the housing operable to continuously monitor air pressure within the air line in real time; and
   a datalogging processor and memory on the circuit board in the housing communicating with the transducer for recording clock time of sensed pressure from the transducer and providing an input to automated lance hose drive control circuitry that initiates automated lance reversal operations upon sensing an obstacle in a tube being cleaned by a cleaning lance driven by the drive apparatus and initiates cleaning fluid pressure dump operations upon sensing an unexpected event.

2. The data logger device according to claim 1 wherein the connector is one of a male and female cam-lock connector fitting adapted to fasten to the air supply line to the flexible lance drive apparatus.

3. A data logger system for a high pressure waterblasting cleaning apparatus including a plurality of data logger devices as in claim 1 communicating with a control circuit for automatically sensing and logging operation of the flexible cleaning lance hose drive apparatus, wherein one of the data logger devices is operably connected to a high pressure dump valve control for automatically diverting high pressure fluid to atmosphere upon sensing the unexpected event.

4. The data logger device of claim 1 wherein, the pressure transducer is connected to a switch operable to move between a first position and a second position in response to a predetermined pressure sensed within the air line.

5. The data logger device of claim 1 wherein the pressure transducer is a piezoelectric pressure cell operable to continuously monitor air pressure in the air line in real time.

6. The data logger device of claim 1 wherein the pressure transducer is a piezo-resistive strain gauge operable to continuously monitor air pressure in the air line in real time.

7. The data logger device of claim 6 wherein the piezo-resistive strain gauge provides an input to the automated lance hose drive control circuitry.

8. The data logger device of claim 7 wherein the automated control circuitry anticipates and senses obstacles in tubes being cleaned and initiates the automated lance reversal operations upon sensing the obstacles in the tubes.

9. A data logging system for a high pressure waterblasting cleaning apparatus comprising:
   a plurality of data logger devices as in claim 1 communicating with a control circuit for continuously monitoring one or more of an individual lance drive speed, lance hose resistance to forward motion, lance direction, and lance penetration distance.

10. The data logging system according to claim 9 wherein one of the data logger devices is operably connected to a high pressure dump valve control for automatically diverting high pressure fluid to atmosphere upon sensing the unexpected event.

11. The data logging system according to claim 9 wherein the connector in each of the plurality of data logger devices is one of a male and female cam-lock connector fitting adapted to fasten to the air supply line to the flexible lance drive apparatus.

12. A data logging system for a high pressure waterblasting cleaning apparatus comprising:
   a plurality of data logging devices as in claim 1 communicating with a control circuit for calculating an applied torque to individual lances.

13. The data logging device of claim 1 wherein the circuit board, the pressure transducer and the datalogging processor are miniaturized and functionally incorporated into a single fitting that is threaded, snap fit or otherwise attached to a fluid T connection of an air motor control line.

14. A flexible cleaning lance hose drive apparatus comprising:
   a drive housing;
   a first air motor in the drive housing for driving a lance hose through the drive housing in a first direction;
   a second air motor in the drive housing for driving the lance hose in a second, opposite direction; and
   a data logging device operably connected to the first air motor via an air pressure supply line, the data logging device having a cylindrical housing removably connected to the first air motor via a quick disconnect fitting attached to the air pressure supply line, a circuit board mounted in the housing, a pressure transducer mounted on the circuit board in the housing operable to sense air pressure within the air pressure supply line and a datalogging processor and memory on the circuit board in the housing communicating with the transducer for recording clock time of sensed pressure from the transducer and providing an input to automated lance hose drive control circuitry that initiates automated lance reversal operations upon sensing an obstacle and initiates cleaning fluid pressure dump operations upon sensing an unexpected pressure event.

15. The apparatus according to claim 14 wherein the pressure transducer is connected to a switch operable to move between a first position and a second position in response to a predetermined pressure sensed within the air line.

16. The apparatus according to claim 14 wherein the pressure transducer is a piezoelectric pressure cell operable to continuously monitor air pressure values in the air line in real time.

17. The apparatus according to claim 14 wherein the pressure transducer is connected to a switch operable to move between a first position and a second position in response to a predetermined pressure sensed within the air pressure supply line.

18. The apparatus according to claim 17 wherein the pressure transducer is a piezo-resistive strain gauge operable to continuously monitor air pressure in the air line in real time.

19. The apparatus according to claim 18 wherein the piezo-resistive strain gauge provides the input to the automated lance hose drive control circuitry.

20. A data logger device for connection to an air pressure supply line to an air motor driving a flexible cleaning lance hose drive apparatus, the device comprising:
   a cylindrical housing having a central axis and removably fastenable to a pressurized air supply line to an air motor driving a flexible lance hose drive apparatus via a quick disconnect fitting connector;
   a circuit board mounted in the housing parallel to the axis;

a piezoresistive strain gauge pressure transducer mounted on the circuit board in the housing operable to continuously monitor air pressure within the air line in real time; and a datalogging processor and memory on the circuit board in the housing communicating with the transducer for recording clock time of sensed pressure from the transducer and providing an input to automated lance hose drive control circuitry that initiates automated lance reversal operations upon sensing an obstacle in a tube being cleaned by a cleaning lance driven by the flexible lance hose drive apparatus and initiates cleaning fluid pressure dump operations upon sensing an unexpected event.

* * * * *